(12) United States Patent
Chung

(10) Patent No.: US 7,021,066 B2
(45) Date of Patent: Apr. 4, 2006

(54) CONTROL METHOD FOR REFRIGERATOR

(75) Inventor: Eui Yeop Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/795,319

(22) Filed: Mar. 9, 2004

(65) Prior Publication Data
US 2005/0076654 A1   Apr. 14, 2005

(30) Foreign Application Priority Data
Oct. 13, 2003   (KR) ................... 10-2003-0071137

(51) Int. Cl.
*F25C 5/02*   (2006.01)

(52) U.S. Cl. ............................ 62/71; 62/353

(58) Field of Classification Search .............. 62/71, 62/351, 353
See application file for complete search history.

(56) References Cited

U.S. PATENT DOCUMENTS

| | | | |
|---|---|---|---|
| 3,180,103 A | 4/1965 | Frohbieter | |
| 3,541,806 A | 11/1970 | Jacobs | |
| 3,611,741 A | 10/1971 | William et al. | |
| 3,771,319 A * | 11/1973 | Nichols et al. | ........... 62/233 |
| 3,775,992 A | 12/1973 | Bright | |
| 4,852,359 A | 8/1989 | Manzotti | |
| 6,092,374 A * | 7/2000 | Kang et al. | ............. 62/74 |
| 6,351,955 B1 | 3/2002 | Oltman et al. | |
| 6,532,751 B1 | 3/2003 | Schenk et al. | |
| 2003/0010053 A1 | 1/2003 | Kim et al. | |

FOREIGN PATENT DOCUMENTS

| | | |
|---|---|---|
| JP | 2002-031464 | 1/2002 |
| JP | 31464 | 1/2002 |
| KR | 011546 | 2/1999 |

OTHER PUBLICATIONS

English language Abstract of JP 2002-31464.
English language Abstract of KR 1999-011546.
English language Abstract of JPX 2002-031464.

* cited by examiner

*Primary Examiner*—William E. Tapolcai
(74) *Attorney, Agent, or Firm*—Greenblum & Bernstein, P.L.C.

(57) ABSTRACT

Disclosed is a control method for a refrigerator, in which cold air is rapidly supplied to an ice-making unit in a quick ice-making mode, thus shortening an ice-making time. The control method includes the steps of (a) quickly making ice from water by turning on the cooling fan regardless of the load of the freezing compartment, when quick ice-making instructions are inputted through a control panel.

12 Claims, 11 Drawing Sheets

CONTROL METHOD FOR REFRIGERATOR

BACKGROUND OF THE INVENTION

1. Field of the Invention

The present invention relates to a control method for a refrigerator, and more particularly to a control method for a refrigerator, in which cold air is blown to an ice-making unit regardless of a load of a freezing compartment when quick ice-making instructions are inputted to the refrigerator.

2. Description of the Related Art

Generally, a refrigerator is an apparatus in which food (hereinafter, referred to as "objects") is stored in a fresh state by a freezing cycle, and is provided with a freezing compartment for storing objects at a sub-zero temperature, a refrigerating compartment for storing objects at an above-zero temperature, and an ice-making unit installed in the freezing compartment for making ice from water using cold air.

Figure 1:
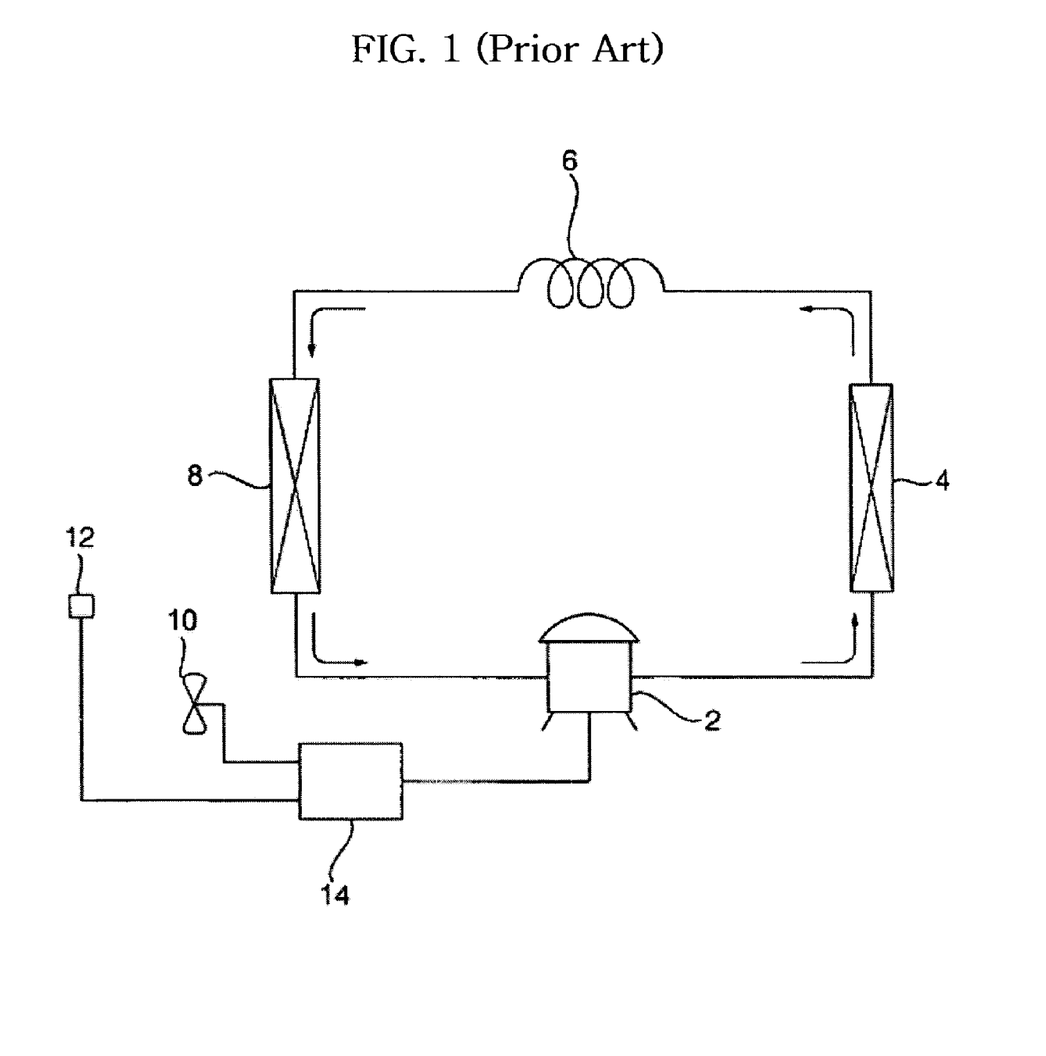
FIG. 1 is a block diagram of a conventional refrigerator, illustrating a freezing cycle.

FIG. 1 is a block diagram of a conventional refrigerator, illustrating a freezing cycle.

As shown in FIG. 1, the conventional refrigerator comprises a compressor 2 for compressing a refrigerant into a high-temperature and high-pressure gaseous state, a condenser 4 for condensing the refrigerant compressed by the compressor 2 by emitting heat of the refrigerant to its circumferential air, an expansion unit 6 for decompressing the refrigerant condensed by the condenser 4, an evaporator 8 for evaporating the refrigerant decompressed by the expansion unit 6 by absorbing heat of the circumferential air, a cooling fan 10 for forcibly convecting air cooled by the evaporator 8 to a freezing or refrigerating compartment, a load sensor 12 for sensing a load of the freezing compartment, and a control unit 14 for turning on or off the compressor 3 and the cooling fan 10 by comparing an obtained value sensed by the load sensor 12 to a predetermined temperature.

Figure 2:
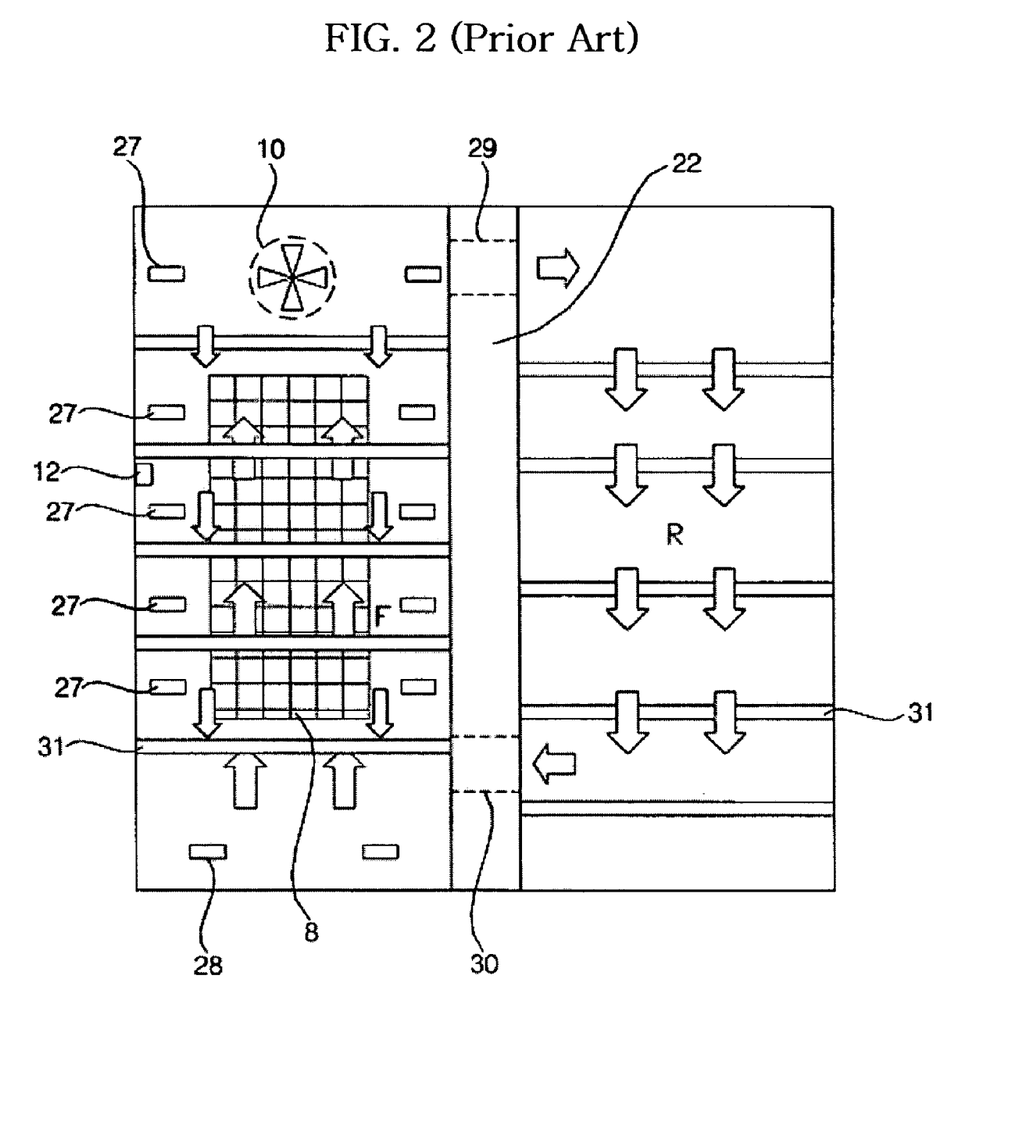
FIG. 2 is a schematic front view showing the inner structure of the conventional refrigerator.
Figure 3:
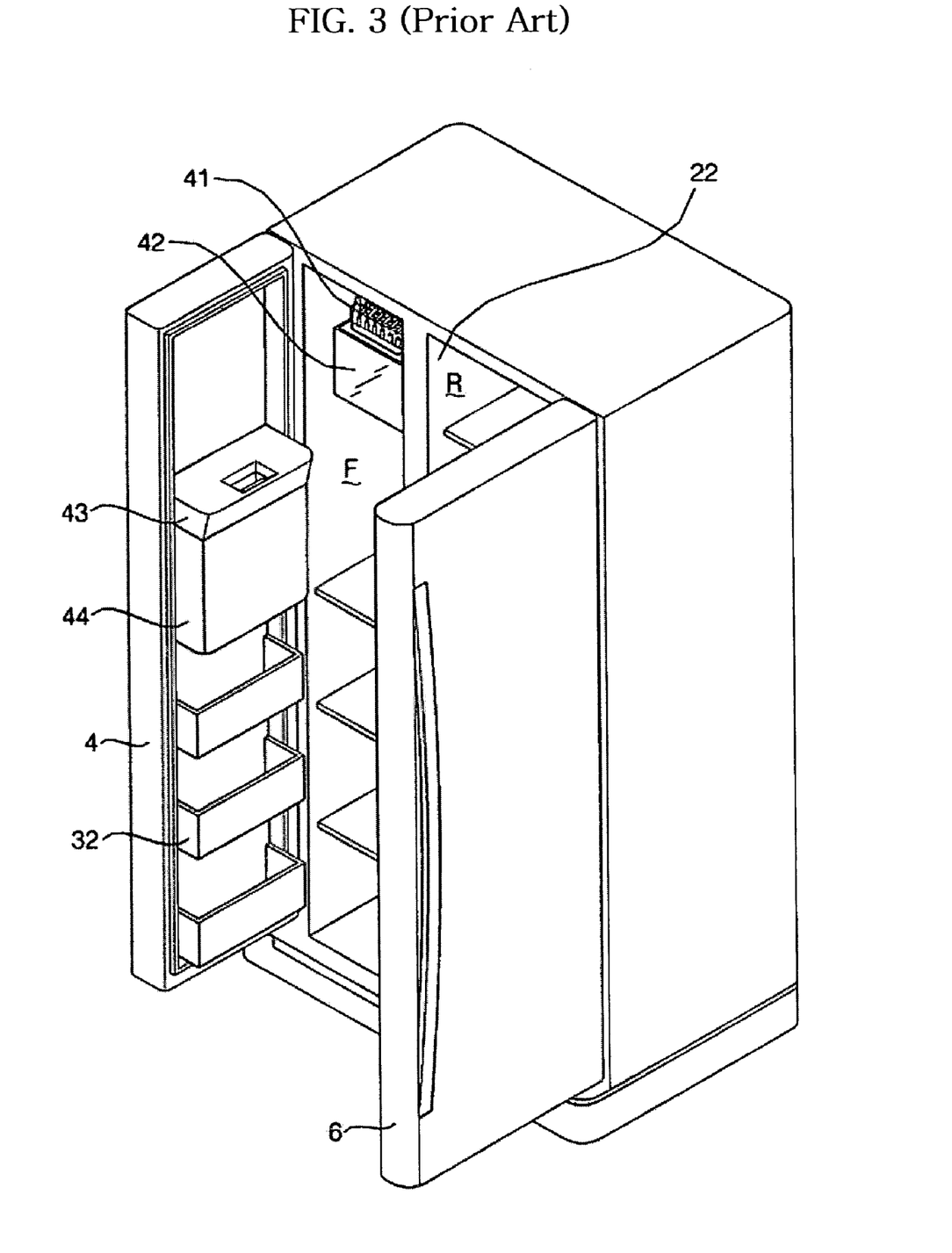
FIG. 3 is a perspective view of the conventional refrigerator, illustrating the condition in which freezing and refrigerating compartments are in an opened state.

FIG. 2 is a schematic front view showing the inner structure of the conventional refrigerator. FIG. 3 is a perspective view of the conventional refrigerator, illustrating the condition in which freezing and refrigerating compartments are in an opened state.

As shown in FIGS. 2 and 3, the conventional refrigerator includes a refrigerator body in which a freezing compartment F and a refrigerating compartment R are arranged close to each other, and defined by a barrier 2 located at opposite sides of the freezing compartment F and the refrigerating compartment R. A freezing compartment door 4 is hingably mounted to the refrigerator body in front of the freezing compartment F such that the freezing compartment 4 is opened or closed by the freezing compartment door 4. A refrigerating compartment door 6 is also hingably mounted to the refrigerator body in front of the refrigerating compartment R such that the refrigerating compartment is opened or closed by the refrigerating compartment door 6.

The freezing compartment F is provided, at the lower portion of the rear wall thereof, with cold air return holes 28 adapted to return the cold air, used to cool the freezing compartment F to a desired freezing temperature, to the circumference of the evaporator 8. The freezing compartment F is also provided, at the upper portion of a rear wall thereof, with cold air discharge holes 27 adapted to discharge the air cooled by the evaporator 8, that is, cold air, into the freezing compartment F.

An ice-making machine 41 for making ice from water and an ice back 42 for containing the ice made by the ice-making machine 41 are installed at the upper portion of the freezing compartment F in front of the uppermost cold air discharge holes 27.

A dispenser 43 for pulling out ice therethrough and an ice chute 44 for guiding ice contained in the ice bank 42 to fall into the dispenser 43 are installed at the rear surface of the freezing compartment door 4.

The barrier 2 is provided, at its upper portion, with a cold air discharge duct 29 for discharging the cold air into the refrigerating compartment R, and at its lower portion, with a cold air return duct 30 for circulating the cold air in the refrigerating compartment R.

A plurality of shelves 31 are located in the freezing compartment F and the refrigerating compartment R such that they are vertically spaced apart from one another, and a plurality of baskets 32 adapted to receive food or containers are mounted to the back surfaces of the freezing compartment door 4 and the refrigerating compartment door 6 such that they are vertically spaced apart from one another.

Now, a control method for the conventional refrigerator having the above mentioned configuration will be described.

Figure 4:
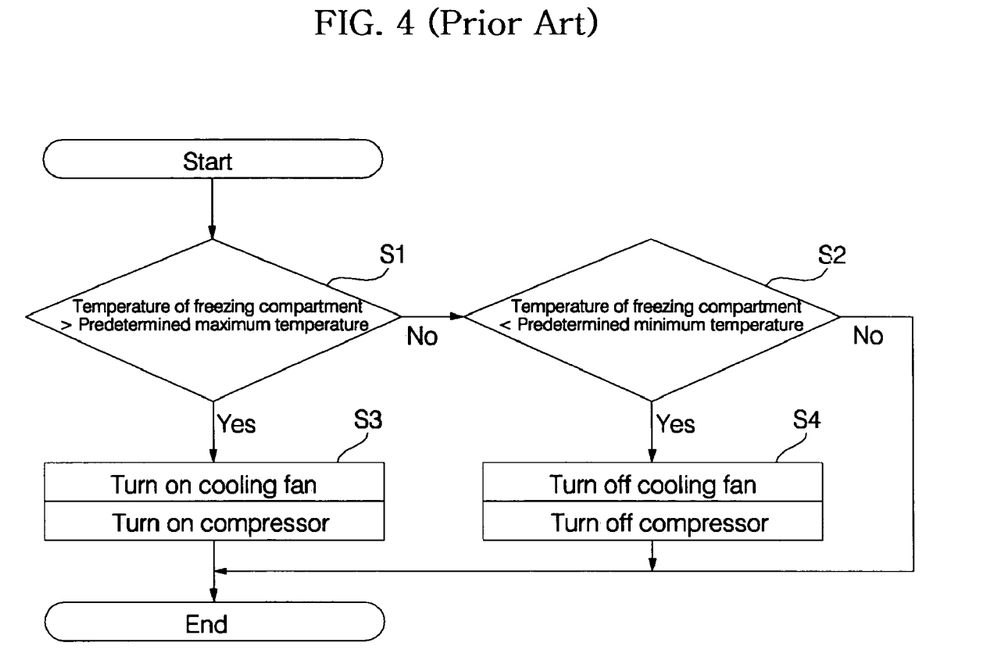
FIG. 4 is a block diagram illustrating a control method for the conventional refrigerator.

FIG. 4 is a block diagram illustrating a control method for the conventional refrigerator.

First, the load sensor 12 senses the temperature of the freezing compartment F, and then outputs a signal corresponding to the sensed temperature to the control unit 14. The control unit 14 compares the temperature of the freezing compartment F sensed by the load sensor 12 to predetermined maximum and minimum temperatures (S1 and S2).

In case that it is determined that the temperature of the freezing compartment F sensed by the load sensor 12 is higher than the predetermined maximum temperature, the control unit 14 turns on the compressor 2 and the cooling fan 10 (S3).

A refrigerant in a low-temperature and low-pressure state flows in the evaporator 8 by the operation of the compressor 2, and air at the circumference of the evaporator 8 passes through the surface of the evaporator 8 and is heat-exchanged with the refrigerant in the low-temperature state, thus having a low temperature. The cold air having the low temperature at the circumference of the evaporator 8 is discharged into the freezing compartment F or the refrigerating compartment R by the operation of the cooling fan 10.

As shown in FIGS. 2 and 3, the cold air is discharged into the freezing compartment F through the cold air discharge holes 27, and moves to the lower portion of the freezing compartment F, thus cooling objects in the freezing compartment F. Then, the cold air is circulated toward the evaporator 12 through the cold air return holes 28.

The cold air, which is discharged into the upper portion of the freezing compartment F through the uppermost cold air discharge holes 27, passes through the ice-making machine 41, thus making ice from water supplied to the ice-making unit 41. Then, the cold air moves to the lower portion of the freezing compartment F.

The ice made by the ice-making unit 41 is transferred to the ice bank 42 and is contained in the ice bank 42. When a user manipulates a control panel or an ice pulling lever, the ice falls into the dispenser 44 through the ice chute 43.

As shown in FIG. 2, the cold air is discharged into the upper portion of the refrigerating compartment R through the cold air discharge duct 29, and moves to the lower portion of the refrigerating compartment R, thus cooling objects in the refrigerating compartment R. Then, the cold air is circulated toward the evaporator 12 through the cold air return duct 30.

In case that it is determined that the temperature of the freezing compartment F sensed by the load sensor 12 is lower than the predetermined minimum temperature, the control unit 14 turns off the compressor 2 and the cooling fan 10 (S4).

Thereafter, the control unit 14 controls the turning on/off of the compressor 2 and the cooling fan 10 according to variation in load (i.e., sensed temperature) of the freezing compartment F.

However, since the compressor 2 for cooling the air of the freezing compartment F and the cooling fan 10 for blowing the air of the freezing compartment F are turned on/off according to the load of the freezing compartment F, the above mentioned control method of the conventional refrigerator has a limitation in rapidly coping with the requirements of users, who want to perform a quick ice-making mode of the ice-making unit.

SUMMARY OF THE INVENTION

Therefore, the present invention has been made in view of the above problems, and it is an object of the present invention to provide a control method for a refrigerator, in which cold air is rapidly supplied to an ice-making unit when a user wants to start a quick ice-making mode, thus shortening time taken to make ice.

In accordance with one aspect of the present invention, the above and other objects can be accomplished by the provision of a control method for a refrigerator, in which a cooling fan and a compressor are controlled according to a load of a freezing compartment, comprising the steps of:

(a) quickly making ice from water by turning on the cooling fan regardless of the load of the freezing compartment, when quick ice-making instructions are inputted through a control panel.

In accordance with another aspect of the present invention, there is provided a control method for a refrigerator, in which a cooling fan, a compressor and freezing compartment dampers are controlled according to a load of a freezing compartment, comprising the steps of: (a) quickly making ice from water by turning on the cooling fan regardless of the load of the freezing compartment and controlling the freezing compartment dampers so that cold air is concentrated on an ice-making unit, when quick ice-making instructions are inputted through a control panel.

In accordance with still another aspect of the present invention, there is provided a control method for a refrigerator, in which a defrosting unit for defrosting an evaporator is controlled and a cooling fan and a compressor are controlled according to a load of a freezing compartment, comprising the steps of: (a) quickly making ice from water by turning on the cooling fan regardless of the load of the freezing compartment and allowing the defrosting unit to be in a standby state, when quick ice-making instructions are inputted through a control panel.

In accordance with yet another aspect of the present invention, there is provided a control method for a refrigerator, in which a defrosting unit for defrosting an evaporator is controlled and a cooling fan, a compressor and freezing compartment dampers are controlled according to a load of a freezing compartment, comprising the steps of: (a) quickly making ice from water by turning on the cooling fan regardless of the load of the freezing compartment, controlling the freezing compartment dampers so that cold air is concentrated on an ice-making unit and allowing the defrosting unit to be in a standby state, when quick ice-making instructions are inputted through a control panel.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 5:
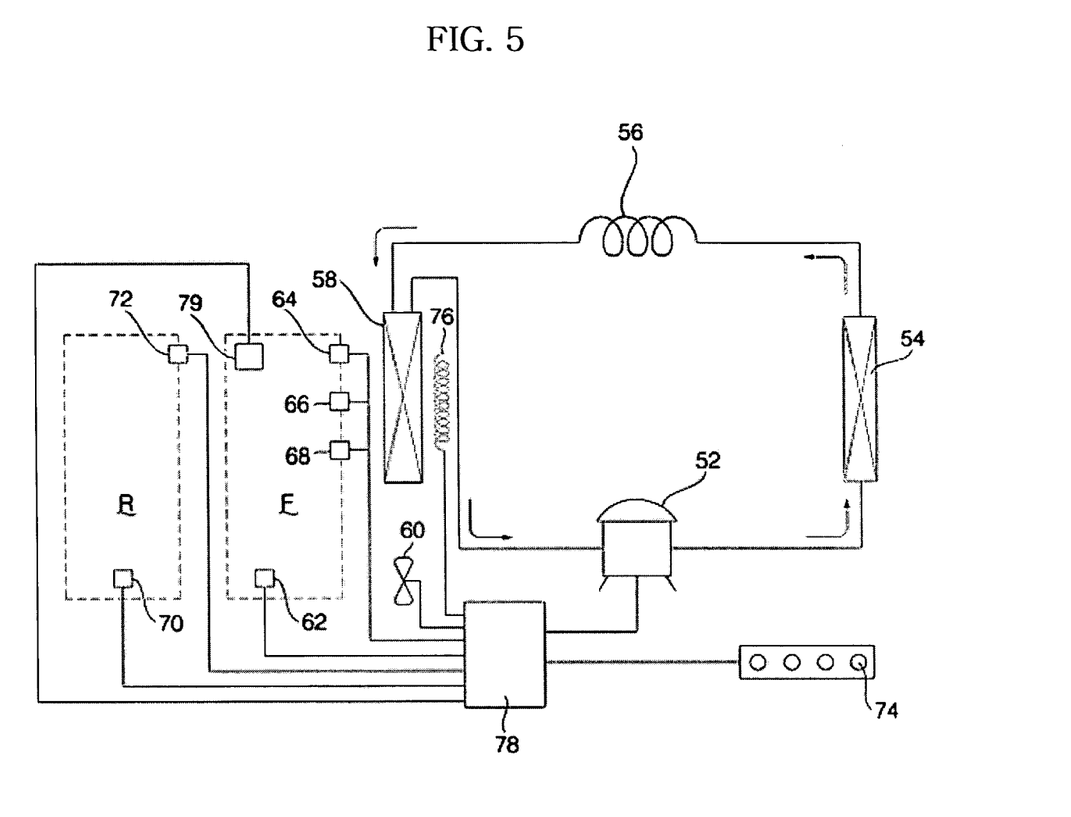
FIG. 5 is a block diagram of a refrigerator, illustrating a freezing cycle, in accordance with the present invention.

FIG. 5 is a block diagram of a refrigerator, illustrating a freezing cycle, in accordance with the present invention.

As shown in FIG. 5, the refrigerator of the present invention comprises a compressor 52 for compressing a refrigerant, a condenser 54 for condensing the refrigerant compressed by the compressor 52 by heat-exchanging the refrigerant with external air, an expansion unit 56 for decompressing the refrigerant condensed by the condenser 54, an evaporator 58 for evaporating the refrigerant decompressed by the expansion unit 56, thus cooling the circumferential air, a cooling fan 60 for convecting air cooled by the evaporator 58 to a freezing compartment F and a refrigerating compartment R, and a freezing compartment load sensor 62 for sensing a load of the freezing compartment F.

The refrigerator further comprises a plurality of freezing compartment dampers 64, 66 and 68 for controlling the discharge of cold air into the freezing compartment F.

The freezing compartment dampers 64, 66 and 68 are vertically spaced apart from one another in the freezing compartment F.

The freezing compartment load sensor 62 is a temperature sensor for sensing the temperature of a certain position in the freezing compartment F, or an infrared sensor.

The refrigerator further comprises a refrigerating compartment load sensor 70 for sensing a load of the refrigerating compartment R, and a damper 72 for controlling the discharge of cold air into the refrigerating compartment R.

The refrigerating compartment load sensor 70 is a temperature sensor for sensing the temperature of a certain position in the refrigerating compartment R, or an infrared sensor.

Here, non-described reference numeral 74 represents a control panel for inputting operating instructions such as quick ice-making instructions therethrough, and non-described numeral 76 represents a defrosting unit for defrosting the evaporator 58.

The defrosting unit 76 is a heater, installed around the evaporator 58, which is heated when power is supplied thereto.

Non-described reference numeral 78 represents a control unit for controlling the compressor 52, the cooling fan 60, the freezing compartment dampers 64, 66 and 68, the refrigerating damper 72, and the defrosting unit 76.

Further, non-described reference numeral 79 represents an ice-making unit for making ice from water supplied to the thereto by means of cold air of the freezing compartment F.

Figure 6:
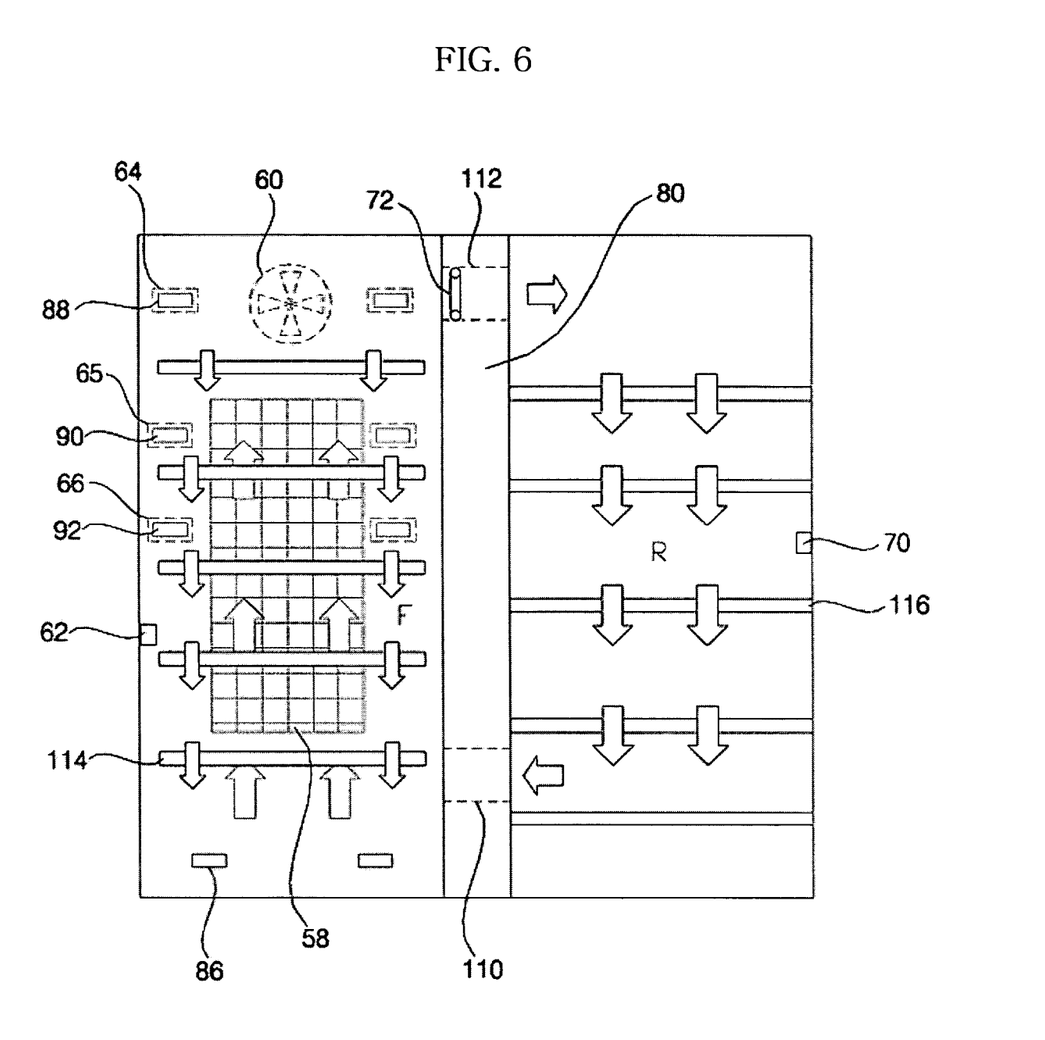
FIG. 6 is a schematic front view showing the inner structure of the refrigerator in accordance with the present invention.

FIG. 6 is a schematic front view showing the inner structure of the refrigerator in accordance with the present invention.

As shown in FIG. 6, the refrigerator of the present invention includes a refrigerator body in which the freezing compartment F and the refrigerating compartment R are arranged close to each other, and defined by a barrier 80 located at opposite sides of the freezing compartment F and the refrigerating compartment R.

The cooling fan 60 and the evaporator 58 are respectively arranged at upper and lower portions of the rear surface of a rear panel of the freezing compartment F.

The freezing compartment F is provided, at the lower portion of the rear panel thereof, with cold air return holes 86 adapted to return the cold air, used to circulate the cold air in the freezing compartment F to the evaporator 58, and at the upper portion of the rear panel thereof, with cold air discharge holes 88, 90 and 92 adapted to discharge the air cooled by the evaporator 8, that is, cold air, into the freezing compartment F. The cold air discharge holes 88, 90 and 92 are vertically spaced from one another in the freezing compartment F.

At least one (for example, the cold air discharge holes 88) of the cold air discharge holes 88, 90 and 92 are located at the rear of the ice-making unit 79 so as to discharge the cold air to the ice-making unit 79, and the rest (for example, the cold air discharge holes 90 and 92) of the cold air discharge holes 88, 90 and 92 are located at other areas so as to discharge the cold air to elements other than the ice-making unit 79.

The freezing compartment dampers 64, 66 and 68 can be designed such that they do not control the cold air discharged to the ice-making unit 79 but control only the cold air discharged to the elements other than the ice-making unit 79. That is, the cold air discharge holes 88 for discharging the cold air to the ice-making unit 79 do not require any freezing compartment damper opened therefrom or closed thereto, but the cold air discharge holes 90 and 92 for discharging the cold air to the elements other than the ice-making unit 79 are provided with a freezing compartment damper opened therefrom or closed thereto.

Further, as shown in FIG. 6, the freezing compartment dampers 64, 66 and 68 can be designed such that at least one freezing compartment dampers (hereinafter, referred to as "ice-making unit-purpose dampers 64") of the freezing compartment dampers 64, 66 and 68 control the cold air discharged to the ice-making unit 79 and the rest 66 and 68 of the freezing compartment dampers 64, 66 and 68 control the cold air discharged to the element other than the ice-making unit 79. That is, the cold air discharge holes 88 for discharging the cold air to the ice-making unit 79 as well as the cold air discharge holes 90 and 92 for discharging the cold air to the elements other than the ice-making unit 79 are provided with a freezing compartment damper opened therefrom or closed thereto.

The barrier 80 is provided, at its lower portion, with a cold air return duct 110 for circulating the cold air in the refrigerating compartment R to the circumference of the evaporator 58, and at its upper portion, with at least one cold air discharge duct 112 for discharging the cold air cooled by the evaporator 58 into the refrigerating compartment R.

The refrigerating compartment damper 72 is installed on the cold air discharge duct 112.

Here, non-described reference numeral 114 represents a plurality of shelves located in the freezing compartment F and the refrigerating compartment R such that they are vertically spaced apart from one another.

Figure 7:
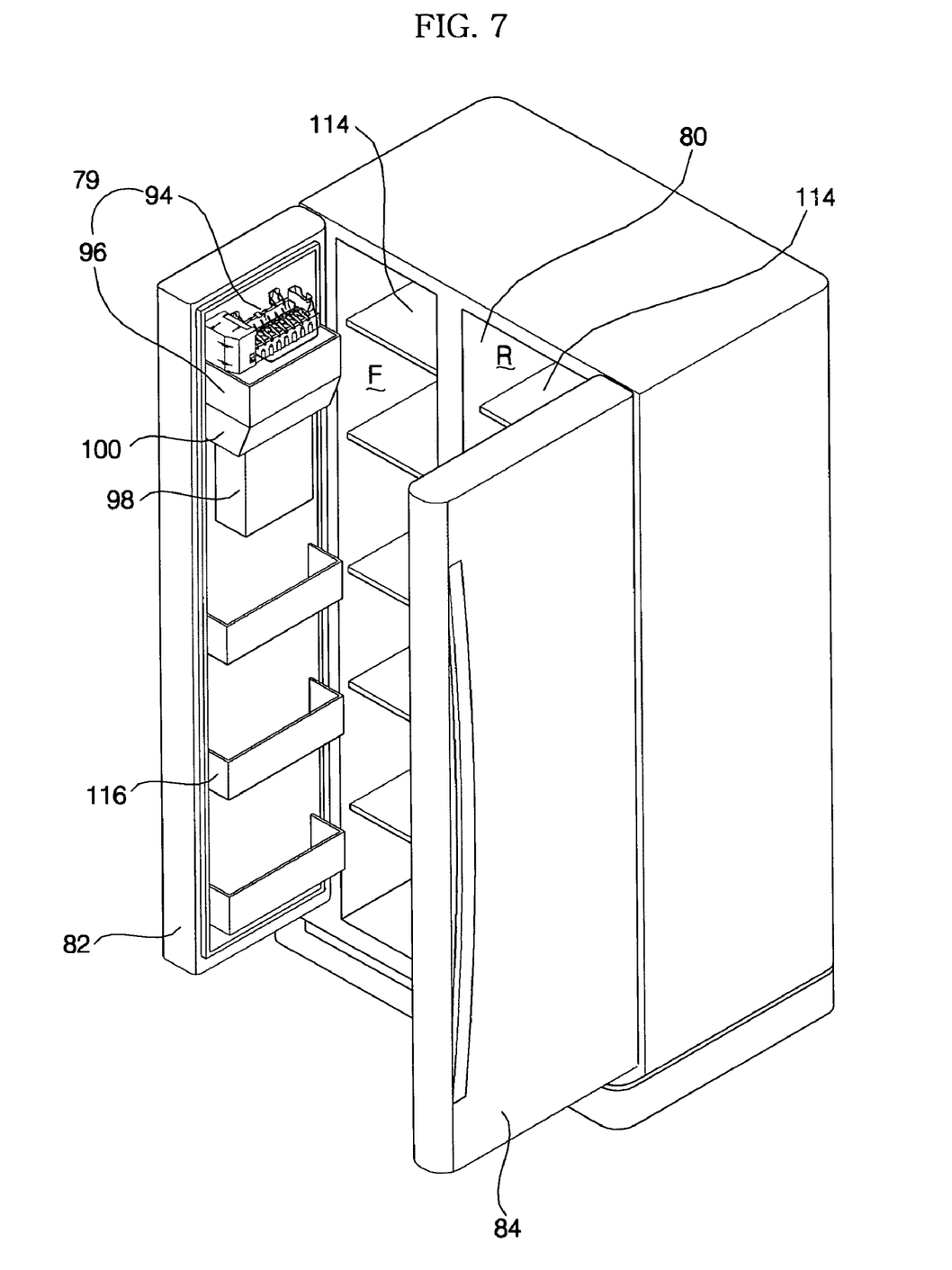
FIG. 7 is a perspective view of the refrigerator, illustrating the condition in which freezing and refrigerating compartments are in an opened state, in accordance with the present invention.

FIG. 7 is a perspective view of the refrigerator, illustrating the condition in which freezing and refrigerating compartments are in an opened state, in accordance with the present invention.

As shown in FIG. 7, a freezing compartment door 82 is hingably mounted to the refrigerator body in front of the freezing compartment F such that the freezing compartment F is opened or closed by the freezing compartment door 82. A refrigerating compartment door 84 is also hingably mounted to the refrigerator body in front of the refrigerating compartment R such that the refrigerating compartment R is opened or closed by the refrigerating compartment R.

The ice-making unit 79 includes an ice-making machine 94 for making ice from water supplied thereto and then transferring the ice, and an ice bank 96 for containing the ice transferred from the ice-making unit 94.

In order to increase the effective inner volume of the freezing compartment F, it is preferable that the ice-making machine 94 is installed on the rear surface of the freezing compartment door 82. Further, preferably, the ice-making machine 94 is located in front of at least one of the cold air discharge holes 88, 90 and 92 of the freezing compartment F. Hereinafter, the ice-making machine 94 is located in front of the uppermost cold air discharge holes 88 for convenience of illustration.

The ice-making machine 94 includes a cup for containing water supplied thereto through a supply hose, an ice-making machine mold for making ice from water transferred from the cup by means of the cold air in the freezing compartment F, a heater, installed in the ice-making machine mold, for heating the ice-making machine mold so that the ice is separated from the ice-making machine mold when the ice is discharged, an ejector, rotatably installed on the upper surface of the ice-making machine mold, for drawing up the ice, a slider for guiding the ice drawn up by the ejector to the ice bank 96, a full ice level sensing lever for sensing whether the ice bank 96 is full of ice, and an ice-making control unit for controlling the heater and ejector according to the temperature of the ice-making machine mold and the full ice level of the ice bank 96 and for controlling a water supply valve for intermitting the water supplied to the cup.

In order to increase the effective inner volume of the freezing compartment F, it is preferable that the ice bank 96 is installed on the rear surface of the freezing compartment door 82 and located under the ice-making machine 94.

The ice bank 96 includes an auger having an opened upper surface thereof for horizontally transferring the ice located therein, a crusher for crushing the transferred ice, an ice outlet for discharging the whole and crushed ice therethrough, and a shutter for opening and closing the ice outlet.

A dispenser 98 for pulling out ice therethrough and an ice chute 100 including a passage for guiding the ice contained in the ice bank 96 to fall into the dispenser 98 are installed on the rear surface of the freezing compartment door 82.

The dispenser 98, installed on the rear surface of the freezing compartment door 82, is located below the ice chute 100, and provided with an opened front surface, through which a container for containing ice is introduced into the dispenser 98, and closed both side and rear surfaces.

The ice chute 100, installed on the rear surface of the freezing compartment door 82, is located under the ice bank 96.

An upper end of the passage of the ice chute 100 is connected to the ice outlet of the ice bank 96, and a lower end of the passage of the ice chute 100 is connected to the inside of the dispenser 98.

Non-described reference numeral 116 represents a plurality of baskets mounted to the rear surfaces of the freezing compartment door 82 and the refrigerating compartment door 84 such that they are vertically spaced apart from one another.

Now, an operation and a control method of the above-described refrigerator in accordance with the present invention will be described in detail.

Figure 8:
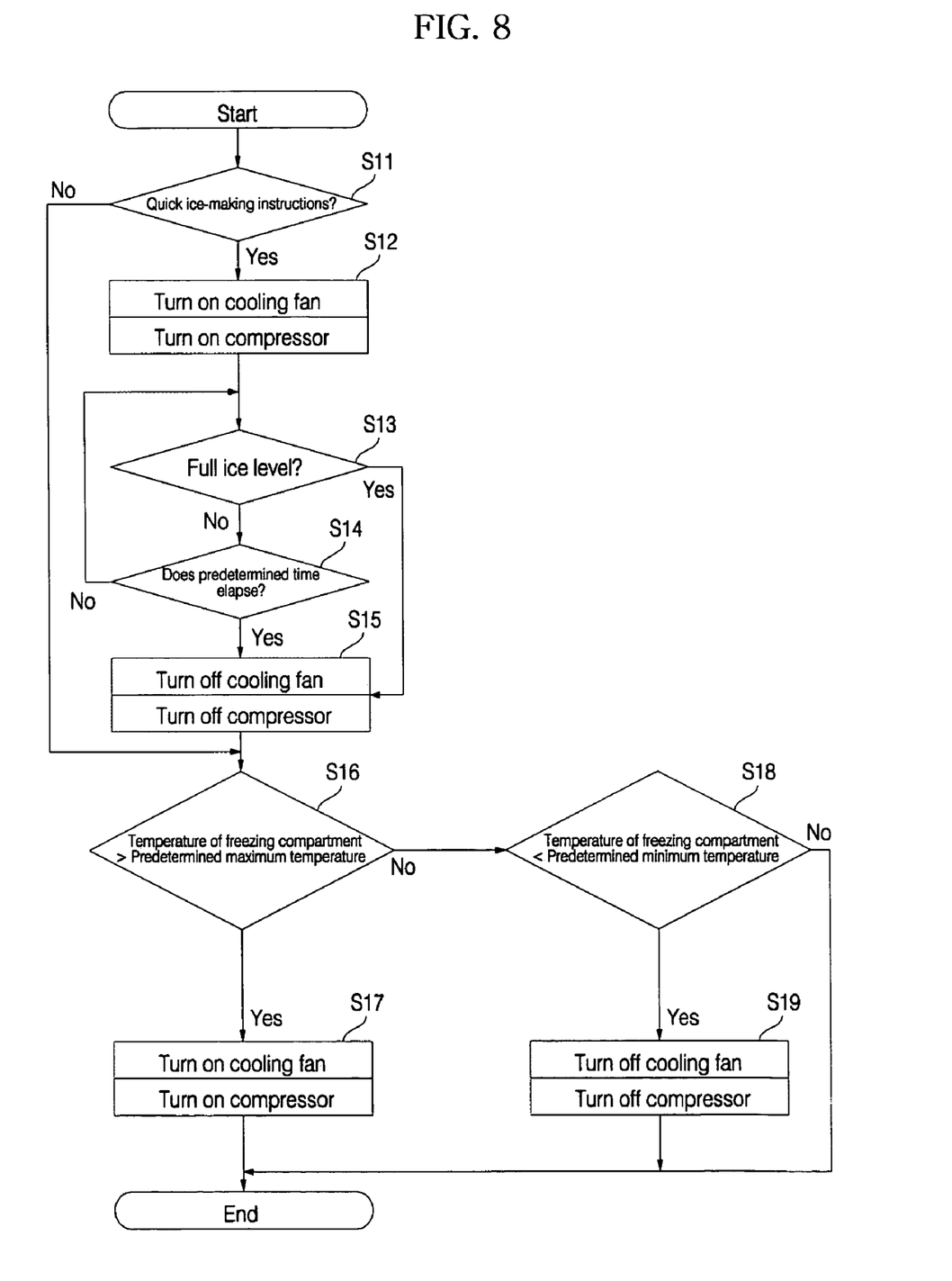
FIG. 8 is a block diagram illustrating a control method for a refrigerator in accordance with a first embodiment of the present invention.

FIG. 8 is a block diagram illustrating a control method for a refrigerator in accordance with a first embodiment of the present invention.

First, when quick ice-making instructions are inputted into the control unit 78 through the control panel 74, the control unit 78 turns on the cooling fan 60 in a quick ice-making mode regardless of the load of the freezing compartment F (S11 and S12).

Then, the control unit 78 turns on the compressor 52 together with the turning-on of the cooling fan 60.

That is, although the temperature of the freezing compartment F sensed by the freezing compartment load sensor 62 is lower than a predetermined minimum temperature, the control unit 78 turns on the cooling fan 60 and the compressor 62.

Here, the control unit 78 operates the cooling fan 60 such that the cooling fan 60 in the quick ice-making mode is rotated at a rotary frequency having a predetermined rpm higher than those in other modes.

In case that the compressor 52 is turned on, a refrigerant in a low-temperature and low-pressure state flows in the evaporator 58 and is heat-exchanged with air at the circumference of the evaporator 58, thus cooling the air to a low temperature.

In case that the cooling fan 60 is turned on, the cold air at the circumference of the evaporator 58 is blown into the freezing compartment F or the refrigerating compartment R.

The cold air, to be blown into the freezing compartment F, as shown in FIG. 6, is discharged into the freezing compartment F through the cold air discharge holes 88, 90 and 92, and moves to the lower portion of the freezing compartment F. Then, the cold air is circulated toward the evaporator 58 through the cold air return holes 86.

A part of the cold air discharged into the freezing compartment F passes through the circumference of the ice-making machine 94 so as to make ice from the water supplied to the ice-making machine 94, and moves to the lower portion of the freezing compartment F. The ice made by the ice-making machine 94 is transferred into the ice bank 96, and is then contained in the ice bank 96.

When the ice bank 96 is filled with the ice during the quick ice-making mode, the control unit 78 turns off the cooling fan 60 and the compressor 52 (S13 and S15).

Then, the control unit 78 performs the above-described quick ice-making mode for a predetermined time.

That is, in case that the full ice level of the ice bank 96 is not sensed and a predetermined time (for example, 10 minutes) from the start of the turning-on of the compressor 52 and the cooling fan 60 elapses, the control unit 78 turns off the cooling fan 60 and the compressor 52 (S14 and S15).

Thereafter, the control unit 78 controls the on/off state of the cooling fan 60 and the compressor 52 according to the load of the freezing compartment F, before new quick ice-making instructions are inputted into the control unit 78 after the termination of the above-described quick ice-making mode.

That is, in case that it is determined that the temperature sensed by the freezing compartment load sensor 62 is higher than a predetermined maximum temperature, the control unit 78 turns on the compressor 52 and the cooling fan 60 (S16 and S17).

The cooling of the air at the circumference of the evaporator 58 based on the ON-state of the compressor 52 and the circulation of the cold air based on the ON-state of the cooling fan 60 are the same as those in the quick ice-making mode, and their detailed description will thus be omitted.

Further, in case that it is determined that the temperature sensed by the freezing compartment load sensor 62 is lower than a predetermined minimum temperature, the control unit 78 turns off the compressor 52 and the cooling fan 60 (S18 and S19).

Thereafter, the control unit 78 controls ON/OFF states of the compressor 52 and the cooling fan 60 according to the variation in the load (sensed temperature) of the freezing compartment F. When quick ice-making instructions are inputted into the control unit 78 through the control panel 74, the control unit 78 controls ON/OFF states of the compressor 52 and the cooling fan 60 in the quick ice-making mode.

Figure 9:
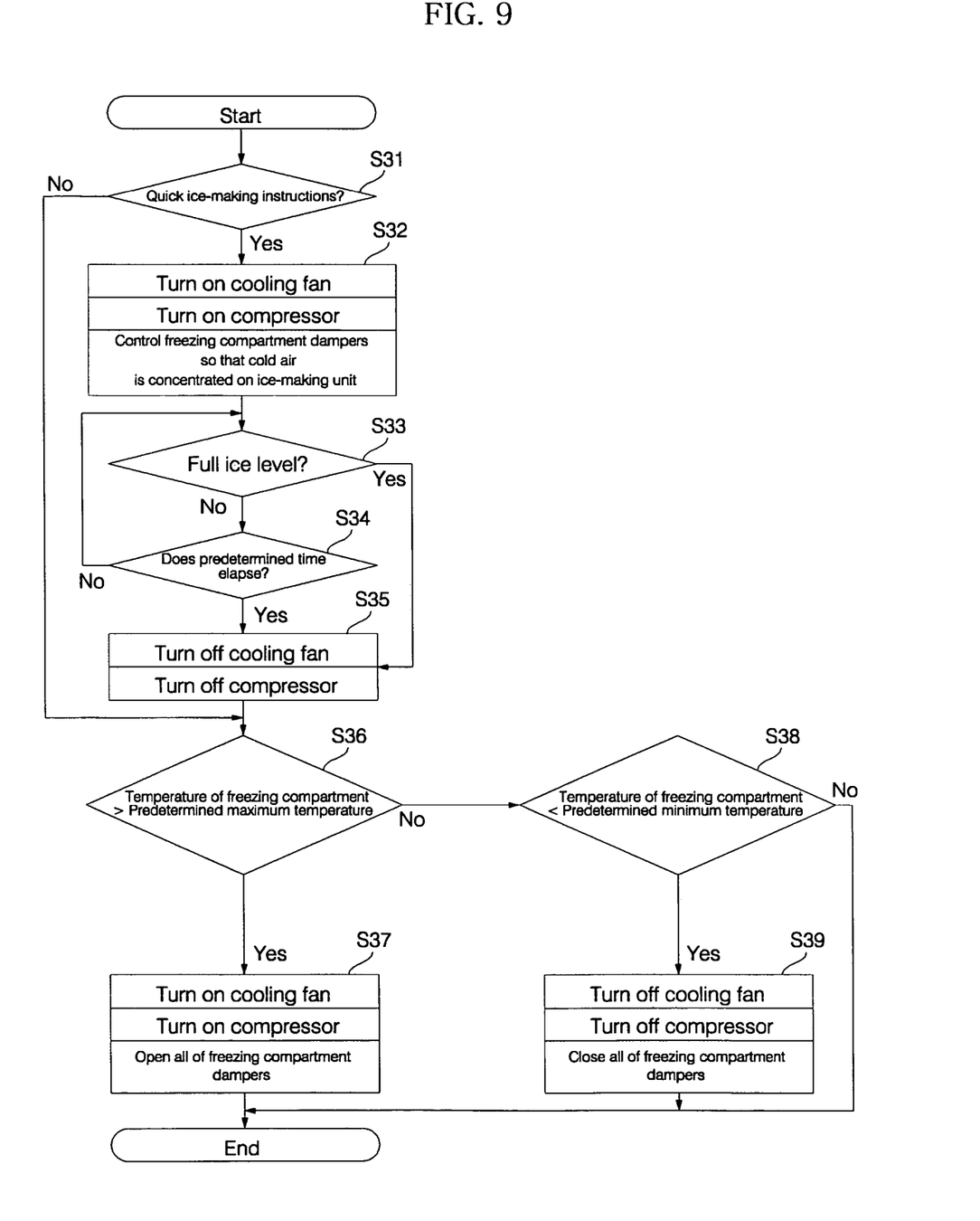
FIG. 9 is a block diagram illustrating a control method for a refrigerator in accordance with a second embodiment of the present invention.

FIG. 9 is a block diagram illustrating a control method for a refrigerator in accordance with a second embodiment of the present invention.

First, when quick ice-making instructions are inputted into the control unit 78 through the control panel 74, the control unit 78 turns on the cooling fan 60 in a quick ice-making mode regardless of the load of the freezing compartment F (S31 and S32).

Then, the control unit 78 turns on the compressor 52 together with the turning-ON of the cooling fan 60.

Thereafter, the control unit 78 closes a part or all of the freezing compartment dampers 64, 66 and 68.

Here, in case that the freezing compartment dampers 64, 66 and 68, as shown in FIG. 6, consist of the ice-making unit-purpose dampers 64 and the rest dampers 66 and 68, when the control unit 78 closes a part of the freezing compartment dampers 64, 66 and 68, the rest dampers 66 and 68 are closed and the ice-making unit-purpose dampers 64 are opened so that the cold air is concentrated on the ice-making unit 79.

Further, when the control unit 78 closes all of the freezing compartment dampers 64, 66 and 68, in case that the cold air discharged to the elements other than the ice-making unit 79 is controlled, all of the freezing compartment dampers 64, 66 and 68 are closed so that the cold air is concentrated on the ice-making unit 79.

Hereinafter, as shown in FIG. 6, the case in which the ice-making unit-purpose dampers 64 out of the freezing compartment dampers 64, 66 and 68 control the air discharged to the ice-making unit 79 and the rest dampers 66 and 68 out of the freezing compartment dampers 64, 66 and 68 control the air discharged to the elements other than the ice-making unit 79 will be described.

The control unit 78 operates the cooling fan 60 such that the cooling fan 60 in the quick ice-making mode is rotated at a rotary frequency having a predetermined rpm higher than those in other modes.

In case that the compressor 52 is turned on, a refrigerant in a low-temperature and low-pressure state flows in the evaporator 58 and is heat-exchanged with air at the circumference of the evaporator 58, thus cooling the air to a low temperature.

In case that the cooling fan 60 is turned on, the cold air at the circumference of the evaporator 58 is blown into the freezing compartment F or the refrigerating compartment R.

Since the cold air discharge holes 90 and 92 for discharging the cold air to the elements other than the ice-making unit 79 are closed by the freezing compartment dampers 66 and 68, the cold air, to be blown into the freezing compartment F, is discharged through only the cold air discharge holes 88, and is then concentrated on the ice-making unit 79.

The cold air concentrated on the ice-making unit 79 passes through the circumference of the ice-making unit 94 so as to rapidly make ice from the water supplied to the ice-making unit 94, and then moves to the lower portion of the freezing compartment F. Then, the cold air is circulated toward the evaporator 58 through the cold air return holes 86.

The ice made by the ice-making machine 94 is transferred into the ice bank 96, and is then contained in the ice bank 96.

When the ice bank 96 is filled with the ice during the quick ice-making mode, the control unit 78 turns off the cooling fan 60 and the compressor 52 (S33 and S35).

Then, the control unit 78 performs the above-described quick ice-making mode for a predetermined time.

That is, in case that the control unit 78 does not sense the full ice level of the ice bank 96 and a predetermined time (for example, 10 minutes) from the start of the turning-on of the compressor 52 and the cooling fan 60 elapses, the control unit 78 turns off the cooling fan 60 and the compressor 52 (S34 and S35).

Thereafter, the control unit 78 turns on/off the cooling fan 60 and the compressor 52 and opens/closes the freezing compartment dampers 64, 66 and 68 according to the load of the freezing compartment F, before new quick ice-making instructions are inputted into the control unit 78 after the termination of the above-described quick ice-making mode.

That is, in case that it is determined that the temperature sensed by the freezing compartment load sensor 62 is higher than a predetermined maximum temperature, the control unit 78 turns on the compressor 52 and the cooling fan 60 and opens all of the freezing compartment dampers 64, 66 and 68 (S36 and S37).

The cooling of the air at the circumference of the evaporator 58 based on the ON-state of the compressor 52 is the same as that in the quick ice-making mode, and its detailed description will thus be omitted.

When the cooling fan 60 is turned on and all of the freezing compartment dampers 64, 66 and 68 are opened, the cold air at the circumference of the evaporator 58 is blown into the freezing compartment F or the refrigerating compartment R.

The cold air blown to the freezing compartment, as shown in FIG. 6, is discharged divisionally to the ice-making unit 79 in the freezing compartment F through the cold air discharge holes 88 and to the elements other than the ice-making unit 79 in the freezing compartment F through the cold air discharge holes 90 and 92.

The cold air discharged into the freezing compartment F and directed to the ice-making unit 79 through the cold air discharge holes 88 cools the ice-making machine 94, and moves to the lower portion of the freezing compartment F. Then, the cold air is circulated toward the evaporator 58 through the cold air return holes 86. The cold air discharged into the freezing compartment F and directed to the elements other than the ice-making unit 79 through the cold air discharge holes 90 and 92 moves to the lower portion of the freezing compartment F. Then, the cold air is circulated toward the evaporator 58 through the cold air return holes 86.

In case that it is determined that the temperature sensed by the freezing compartment load sensor 62 is lower than a predetermined minimum temperature, the control unit 78 turns off the compressor 52 and the cooling fan 60 and closes all of the freezing compartment dampers 64, 66 and 68 (S38 and S39).

Thereafter, the control unit 78 controls the ON/OFF state of the compressor 52 and the cooling fan 60 and the opening/closing of the freezing compartment dampers 64, 66 and 68 according to the variation in the load (temperature) of the freezing compartment F. When quick ice-making instructions are inputted into the control unit 78 through the control panel 74, the control unit 78 controls the compressor 52, the cooling fan 60, and the freezing compartment dampers 64, 66 and 68 under the quick ice-making mode.

The present invention is not limited by the above-described second embodiment. That is, it is possible to circulate the cold air only in the circumference of the evaporator 58 and the freezing compartment F by closing the refrigerating damper 72 also during the quick ice-making mode. In this case, the cold air cooled by the evaporator 58 is concentrated on the ice-making unit 79, and water in the ice-making machine 94 is rapidly frozen.

Figure 10:
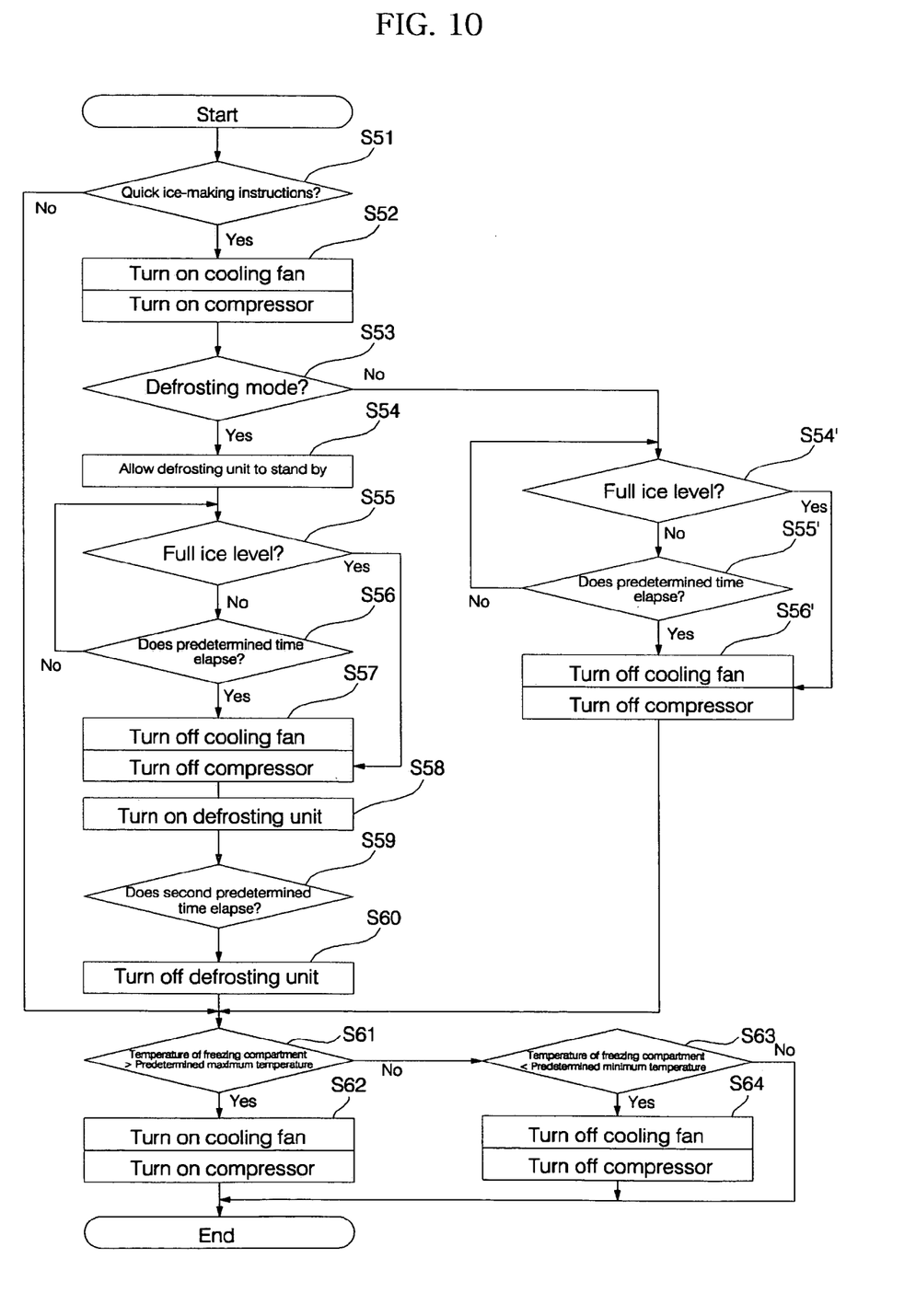
FIG. 10 is a block diagram illustrating a control method for a refrigerator in accordance with a third embodiment of the present invention.

FIG. 10 is a block diagram illustrating a control method for a refrigerator in accordance with a third embodiment of the present invention.

First, when quick ice-making instructions are inputted into the control unit 78 through the control panel 74, the control unit 78 turns on the cooling fan 60 in a quick ice-making mode regardless of the load of the freezing compartment F (S51 and S52).

Then, the control unit 78 turns on the compressor 52 together with the turning-ON of the cooling fan 60.

That is, although the temperature of the freezing compartment F sensed by the freezing compartment load sensor 62 is lower than a predetermined minimum temperature, the control unit 78 turns on the cooling fan 60 and the compressor 62.

Here, the control unit 78 operates the cooling fan 60 such that the cooling fan 60 in the quick ice-making mode is rotated at a rotary frequency having a predetermined rpm higher than those in other modes.

In case that the compressor 52 is turned on, a refrigerant in a low-temperature and low-pressure state flows in the evaporator 58 and is heat-exchanged with air at the circumference of the evaporator 58, thus cooling the air to a low temperature.

In case that the cooling fan 60 is turned on, the cold air at the circumference of the evaporator 58 is blown into the freezing compartment F or the refrigerating compartment R.

The cold air, blown into the freezing compartment F, as shown in FIG. 6, is discharged into the freezing compartment F through the cold air discharge holes 88, 90 and 92, and moves to the lower portion of the freezing compartment F. Then, the cold air is circulated toward the evaporator 58 through the cold air return holes 86.

A part of the cold air discharged into the freezing compartment F passes through the circumference of the ice-making machine 94 so as to make ice from the water supplied to the ice-making machine 94, and moves to the lower portion of the freezing compartment F. The ice made by the ice-making machine 94 is transferred into the ice bank 96, and is then contained in the ice bank 96.

Although an accumulated operation time of the compressor 52 exceeds a predetermined defrost time (for example, 10 hours) during the quick ice-making mode, the control unit 78 does not turn on the defrosting unit 76, but allows the defrosting unit 76 to stand by until the quick ice-making mode is terminated (S53 and S54).

When the ice bank 96 is filled with the ice during the quick ice-making mode, the control unit 78 turns off the cooling fan 60 and the compressor 52 (S55 and S57).

Then, the control unit 78 performs the above-described quick ice-making mode for a predetermined time (for example, 10 minutes).

That is, in case that the control unit 78 does not sense the full ice level of the ice bank 96 and the predetermined time (for example, 10 minutes) from the start of the turning-on of the compressor 52 and the cooling fan 60 elapses, the control unit 78 turns off the cooling fan 60 and the compressor 52.

When the above-described quick ice-making mode is terminated, the control unit 78 turns on the defrosting unit 76, which was in the standby state during the quick ice-making mode (S58).

In the ON state of the defrosting unit 76, the surface of the evaporator 58 is heated and defrosted by the operation of the defrosting unit 76.

When a second predetermined time (for example, 3 minutes) from the start of the ON state of the defrosting unit 76 elapses, the control unit 78 turns off the defrosting unit 76 (S59 and S60).

Thereafter, the control unit 78 controls the ON/OFF states of the cooling fan 60 and the compressor 52 according to the load of the freezing compartment F, before new quick ice-making instructions are inputted into the control unit 78.

That is, in case that it is determined that the temperature sensed by the freezing compartment load sensor 62 is higher than a predetermined maximum temperature, the control unit 78 turns on the compressor 52 and the cooling fan 60 (S61 and S62).

The cooling of the air at the circumference of the evaporator 58 based on the ON-state of the compressor 52 and the circulation of the cold air based on the ON-state of the cooling fan 60 are the same as those in the quick ice-making mode, and their detailed descriptions will thus be omitted.

Further, in case that it is determined that the temperature sensed by the freezing compartment load sensor 62 is lower than a predetermined minimum temperature, the control unit 78 turns off the compressor 52 and the cooling fan 60 (S63 and S64).

In case that the accumulated operation time of the compressor 52 exceeds the predetermined defrost time (for example, 10 hours) again under the ON states of the cooling fan 60 and the compressor 52 according to the load of the freezing compartment F, the control unit 78 turns off the compressor 52 and the cooling fan 60 and turns on the defrosting unit 76 for the second predetermined time (for example, 3 minutes), and turns off the defrosting unit 76 after the second predetermined time (for example, 3 minutes) elapses.

Since the control method for the refrigerator, in case that the accumulated operation time of the compressor 52 does not exceed the predetermined defrost time (for example, 10 hours) during a quick defrosting mode, in accordance with the third embodiment of the present invention is the same as that in accordance with the first embodiment of the present invention, a detailed description thereof will thus be omitted (S54', S55', S56', S61, S62, S63 and S64).

Figure 11:
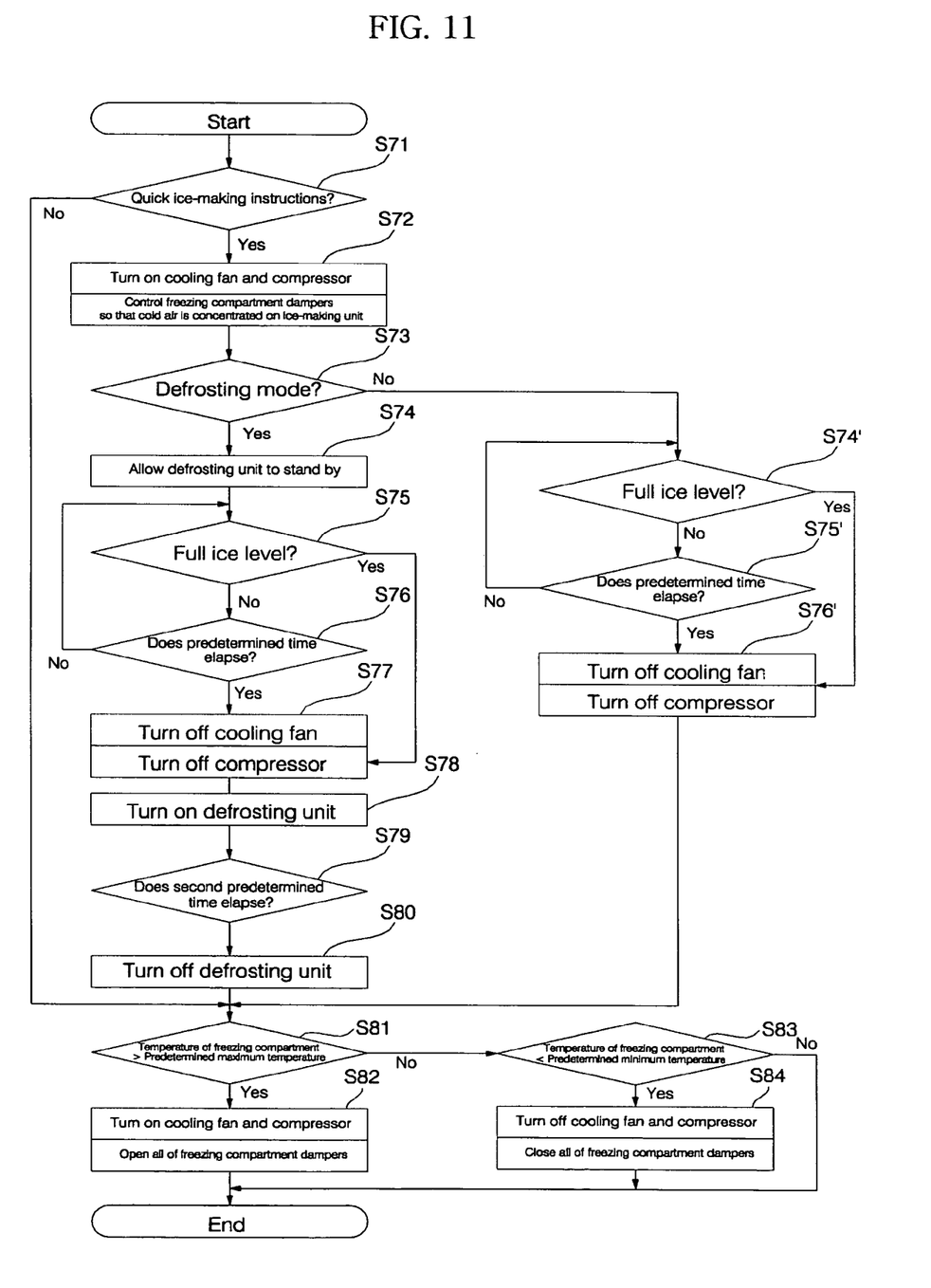
FIG. 11 is a block diagram illustrating a control method for a refrigerator in accordance with a fourth embodiment of the present invention.

FIG. 11 is a block diagram illustrating a control method for a refrigerator in accordance with a fourth embodiment of the present invention.

First, when quick ice-making instructions are inputted into the control unit 78 through the control panel 74, the control unit 78 turns on the cooling fan 60 in a quick ice-making mode regardless of the load of the freezing compartment F (S71 and S72).

Then, the control unit 78 turns on the compressor 52 together with the turning-ON of the cooling fan 60.

Here, the control unit 78 operates the cooling fan 60 such that the cooling fan 60 in the quick ice-making mode is rotated at a rotary frequency having a predetermined rpm higher than those in other modes.

In the same manner as the second embodiment of the present invention, the control unit 78 closes a part or all of the freezing compartment dampers 64, 66 and 68.

The control of the opening/closing of the freezing compartment dampers 64, 66 and 68 is the same as that of the second embodiment of the present invention, and its detailed description will thus be omitted.

In case that the compressor 52 is turned on, a refrigerant in a low-temperature and low-pressure state flows in the evaporator 58 and is heat-exchanged with air at the circumference of the evaporator 58, thus cooling the air to a low temperature.

In case that the cooling fan 60 is turned on and a part or all of the freezing compartment dampers 64, 65 and 66 are closed, the cold air at the circumference of the evaporator 58 is discharged into the freezing compartment F or the refrigerating compartment R.

Since the cold air discharge holes 90 and 92 for discharging the cold air to the elements other than the ice-making unit 79 are closed by the freezing compartment dampers 66 and 68, the cold air, to be blown into the freezing compartment F, is discharged through only the cold air discharge holes 88, and is then concentrated on the ice-making unit 79.

The cold air concentrated on the ice-making unit 79 passes through the circumference of the ice-making machine 94 so as to rapidly make ice from the water supplied to the ice-making machine 94, and then moves to the lower portion of the freezing compartment F. Then, the cold air is circulated toward the evaporator 58 through the cold air return holes 86.

The ice made by the ice-making machine 94 is transferred into the ice bank 96, and is then contained in the ice bank 96.

Although an accumulated operation time of the compressor 52 exceeds a predetermined defrost time (for example, 10 hours) during the quick ice-making mode, the control unit 78 does not turn on the defrosting unit 76, but allows the defrosting unit 76 to stand by until the quick ice-making mode is terminated (S73 and S74).

When the ice bank 96 is filled with the ice during the quick ice-making mode, the control unit 78 turns off the cooling fan 60 and the compressor 52 (S75 and S77).

Then, the control unit 78 performs the above-described quick ice-making mode for a predetermined time (for example, 10 minutes).

That is, in case that the control unit 78 does not sense the full ice level of the ice bank 96 and the predetermined time (for example, 10 minutes) from the start of the turning-on of the compressor 52 and the cooling fan 60 elapses, the control unit 78 turns off the cooling fan 60 and the compressor 52 (S76 and S77).

When the above-described quick ice-making mode is terminated, the control unit 78 turns on the defrosting unit 76, which was in the standby state during the quick ice-making mode (S78).

The control and function of the defrosting unit 76 are the same as those of the third embodiment of the present invention, and their detailed descriptions will thus be omitted (S79 and S80).

Thereafter, the control unit 78 controls the ON/OFF states of the cooling fan 60 and the compressor 52 according to the load of the freezing compartment F and the opening/closing of the freezing compartment dampers 64, 66 and 68, before new quick ice-making instructions are inputted into the control unit 78 after the turning-off of the defrosting unit 76.

That is, in case that it is determined that the temperature sensed by the freezing compartment load sensor 62 is higher than a predetermined maximum temperature, the control unit 78 turns on the compressor 52 and the cooling fan 60 and opens all of the freezing compartment dampers 64, 66 and 68 (S81 and S82).

The cooling of the air at the circumference of the evaporator 58 based on the ON-state of the compressor 52 and the circulation of the cold air based on the ON-state of the cooling fan 60 and the opening of the freezing compartment dampers 64, 66 and 68 are the same as those of the second embodiment of the present invention, and their detailed descriptions will thus be omitted.

In case that it is determined that the temperature sensed by the freezing compartment load sensor 62 is lower than a predetermined minimum temperature, the control unit 78 turns off the compressor 52 and the cooling fan 60 and closes all of the freezing compartment dampers 64, 66 and 68 (S83 and S84).

In case that the accumulated operation time of the compressor 52 exceeds the predetermined defrost time (for example, 10 hours) again under the ON states of the cooling fan 60 and the compressor 52 and the opened states of the freezing compartment dampers 64, 66 and 68 according to the load of the freezing compartment F, the control unit 78 turns off the compressor 52 and the cooling fan 60 and turns on the defrosting unit 76 for the second predetermined time (for example, 3 minutes), and turns off the defrosting unit 76 after the second predetermined time (for example, 3 minutes) elapses.

Since the control method for the refrigerator, in case that the accumulated operation time of the compressor 52 does not exceed the predetermined defrost time (for example, 10 hours) during a quick defrosting mode, in accordance with the fourth embodiment of the present invention is the same as that in accordance with the first embodiment of the present invention, a detailed description thereof will thus be omitted (S74', S75', S76', S81, S82, S83 and S84).

As apparent from the above description, the present invention provides a control method for a refrigerator having several advantages, as follows.

First, since a cooling fan is turned on regardless of a load of a freezing compartment when quick ice-making instructions are inputted, it is possible to forcibly blow cold air to an ice-making unit, thus rapidly achieving ice-making.

Second, since the cooling fan is turned on regardless of the load of the freezing compartment and a part or all of freezing dampers are closed when quick ice-making instructions are inputted, it is possible to concentrate cold air on the ice-making unit, thus rapidly achieving ice-making.

Third, since the cooling fan is turned on regardless of the load of the freezing compartment and a defrosting unit is in a standby state when quick ice-making instructions are inputted, it is possible to optimally cope with the requirements of users.

Fourth, since the cooling fan in a quick ice-making mode is rotated at a rotary frequency having a predetermined rpm higher than those in other modes, it is possible to increase the amount of circulation of the cold air, thus rapidly achieving ice-making.

Fifth, since a compressor is turned on regardless of the load of the freezing compartment when a user wants to set the quick ice-making mode, it is possible to continuously cool the cold air supplied to the ice-making unit.

Sixth, since the quick ice-making mode is performed for a predetermined time, it is possible to rapidly make ice during the predetermined time and to cope with the load of the freezing compartment after the predetermined time elapses.

Seventh, since the quick ice-making mode is terminated when an amount of the ice made by the ice-making unit exceeds a predetermined level, it is possible to prevent unnecessary quick ice-making and overcooling of the freezing compartment and to optimally cope with the load of the freezing compartment.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A control method for a refrigerator, in which a cooling fan, a compressor and freezing compartment dampers are controlled according to a load of a freezing compartment, comprising:

(a) quickly making ice from water by turning on the cooling fan regardless of the load of the freezing compartment and controlling the freezing compartment dampers so that cold air is concentrated on an ice-making unit, when quick ice-making instructions are inputted through a control panel.

2. The control method as set forth in claim 1, wherein the cooling fan in the step (a) is rotated at a rotary frequency having a predetermined rpm higher than in other steps.

3. The control method as set forth in claim 1, wherein in the step (a) the compressor is turned on together with the turning-on of the cooling fan.

4. The control method as set forth in claim 1, wherein the step (a) is performed for a predetermined time.

5. The control method as set forth in claim 1,
wherein the step (a) is terminated when an amount of the ice made by the ice-making unit exceeds a predetermined level.

6. The control method as set forth in claim 1, wherein in the step (a):
the freezing compartment dampers, that open and close cold air discharge holes directed to the ice-making unit, are opened; and
the freezing compartment dampers, that open and close cold air discharge holes not directed to the ice-making unit, are closed.

7. A control method for a refrigerator, in which a defrosting unit for defrosting an evaporator is controlled and a cooling fan, a compressor and freezing compartment dampers are controlled according to a load of a freezing compartment, comprising:
(a) quickly making ice from water by turning on the cooling fan regardless of the load of the freezing compartment, controlling the freezing compartment dampers so that cold air is concentrated on an ice-making unit and allowing the defrosting unit to be in a standby state, when quick ice-making instructions are inputted through a control panel.

8. The control method as set forth in claim 7,
wherein the cooling fan in the step (a) is rotated at a rotary frequency having a predetermined rpm higher than other steps.

9. The control method as set forth in claim 7,
wherein in the step (a) the compressor is turned on together with the turning-on of the cooling fan.

10. The control method as set forth in claim 7,
wherein the step (a) is performed for a predetermined time.

11. The control method as set forth in claim 7,
wherein the step (a) is terminated when an amount of the ice made by the ice-making unit exceeds a predetermined level.

12. The control method as set forth in claim 7, wherein in the step (a):
the freezing compartment dampers, that open and close cold air discharge holes directed to the ice-making unit, are opened; and
the freezing compartment dampers, that open and close cold air discharge holes not directed to the ice-making unit, are closed.

* * * * *